US008491314B2

(12) United States Patent
Baek

(10) Patent No.: US 8,491,314 B2
(45) Date of Patent: Jul. 23, 2013

(54) CONNECTING TAB AND SECONDARY BATTERY HAVING THE SAME

(75) Inventor: Woon-Seong Baek, Yongin-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 0 days.

(21) Appl. No.: 13/241,753

(22) Filed: Sep. 23, 2011

(65) Prior Publication Data

US 2012/0142230 A1 Jun. 7, 2012

(30) Foreign Application Priority Data

Dec. 1, 2010 (KR) .................... 10-2010-0121467

(51) Int. Cl.
*H01R 12/00* (2006.01)
(52) U.S. Cl.
USPC ............................................ 439/66
(58) Field of Classification Search
USPC ............... 439/754, 884, 66; 429/185, 163, 429/121
See application file for complete search history.

(56) References Cited

U.S. PATENT DOCUMENTS

| 4,017,142 A | * | 4/1977 | Clark et al. | 439/870 |
|---|---|---|---|---|
| 4,735,575 A | * | 4/1988 | Shaffer | 439/82 |
| 4,752,250 A | * | 6/1988 | Seidler | 439/751 |
| 5,135,403 A | * | 8/1992 | Rinaldi | 439/82 |
| 5,451,174 A | * | 9/1995 | Bogursky et al. | 439/876 |
| 5,497,546 A | * | 3/1996 | Kubo et al. | 29/843 |
| 5,766,045 A | * | 6/1998 | Sawaki et al. | 439/857 |
| 6,011,222 A | * | 1/2000 | Sekiya et al. | 174/266 |
| 6,168,441 B1 | * | 1/2001 | Buchart | 439/82 |
| 6,552,277 B1 | * | 4/2003 | Downes | 174/267 |
| 6,623,283 B1 | * | 9/2003 | Torigian et al. | 439/83 |
| 6,848,952 B2 | * | 2/2005 | Norris | 439/751 |
| 6,997,757 B2 | * | 2/2006 | Roshardt | 439/751 |
| 7,347,750 B2 | * | 3/2008 | Cachina et al. | 439/876 |

(Continued)

FOREIGN PATENT DOCUMENTS

KR 10-0601514 B 7/2006
KR 100646538 11/2006

(Continued)

OTHER PUBLICATIONS

Korean Office action issued by Korean Patent Office on Sep. 8, 2011, corresponding to KR Application No. 10-2010-0121467 and Request for Entry attached herewith.

(Continued)

*Primary Examiner* — Alexander Gilman
(74) *Attorney, Agent, or Firm* — Robert E. Bushnell, Esq.

(57) ABSTRACT

A connecting tab connected between an electrode terminal of a cap plate and an electrode terminal of a protection circuit module (PCM) in a secondary battery. The connecting tab includes a PCM mounting portion, a bent portion and a terminal connecting portion. The PCM mounting portion is connected to the electrode terminal of the PCM. The bent portion is extended from the PCM mounting portion and makes a predetermined angle with the PCM mounting portion, and has at least one cut-away portion formed therein. The terminal connecting portion is formed bent portion on the same plane with the bent portion, and extended in a lateral direction from an upper portion of the bent portion. Accordingly, an electrical connection between a secondary battery cell and the PCM can be performed only through a simple process by using the connecting tab provided with the bent portion.

16 Claims, 7 Drawing Sheets

U.S. PATENT DOCUMENTS

| | | | |
|---|---|---|---|
| 7,485,017 B2 * | 2/2009 | Pang et al. | 439/876 |
| 7,723,620 B2 * | 5/2010 | Kawade et al. | 174/267 |
| 7,893,355 B2 * | 2/2011 | Oh et al. | 174/94 R |
| 8,153,900 B2 * | 4/2012 | Takeuchi et al. | 174/126.1 |
| 2002/0117330 A1 * | 8/2002 | Eldridge et al. | 174/260 |
| 2004/0259434 A1 * | 12/2004 | Pitzele | 439/884 |
| 2007/0026296 A1 | 2/2007 | Byun et al. | |
| 2008/0009155 A1 * | 1/2008 | Ide et al. | 439/83 |
| 2009/0155631 A1 * | 6/2009 | Baek et al. | 429/7 |
| 2009/0246620 A1 | 10/2009 | Lee et al. | |
| 2009/0305118 A1 | 12/2009 | Kim | |
| 2009/0317715 A1 | 12/2009 | Jung et al. | |
| 2010/0000761 A1 * | 1/2010 | Oh et al. | 174/126.1 |
| 2010/0086845 A1 | 4/2010 | Jung et al. | |
| 2010/0092860 A1 | 4/2010 | Seo et al. | |
| 2010/0098973 A1 | 4/2010 | Lee et al. | |
| 2010/0159289 A1 | 6/2010 | Kim et al. | |
| 2010/0291413 A1 | 11/2010 | Seo et al. | |
| 2011/0068473 A1 * | 3/2011 | Lee et al. | 257/773 |
| 2012/0040209 A1 | 2/2012 | Baek et al. | |

FOREIGN PATENT DOCUMENTS

| | | |
|---|---|---|
| KR | 1020090063846 A | 6/2009 |
| KR | 10-0933843 B | 12/2009 |
| KR | 10-2010-0121336 A | 11/2010 |
| KR | 101040975 | 6/2011 |

OTHER PUBLICATIONS

Korean Office Action issued by KIPO on Nov. 2, 2012 in connection with Korean Patent Application No. 10-2010-0121467 and Request for Entry of the Accompanying Office Action attached herewith.

* cited by examiner

CONNECTING TAB AND SECONDARY BATTERY HAVING THE SAME

CLAIM OF PRIORITY

This application makes reference to, incorporates the same herein, and claims all benefits accruing under 35 U.S.C. §119 from an application for CONNECTING TAB AND SECONDARY BATTERY HAVING THE SAME earlier filed in the Korean Intellectual Property Office on 1 Dec. 2010 and there duly assigned Serial No. 10-2010-0121467.

BACKGROUND OF THE INVENTION

1. Field of the Invention

An aspect of the present invention relates to a connecting tab and a secondary battery having the same, and more particularly, to a connecting tab with a structure to facilitate the mounting of a protection circuit module and a secondary battery to which the protection circuit module is connected using the connecting tab.

2. Description of the Related Art

Secondary batteries may be classified into a can-type battery formed in a cylindrical or prismatic shape and a pouch-type battery having flexibility.

SUMMARY OF THE INVENTION

It is therefore an aspect of the present invention to provide an improved connecting tab and an improved second battery.

It is another aspect of the present invention to provide a connecting tab and a secondary battery having the same that enables an electrical connection between a secondary battery cell and a protection circuit module (hereinafter, referred to as a 'PCM') only through a simplified manufacturing process.

It is still another aspect of the present invention to provide a simplified process of assembling the secondary battery.

According to an aspect of the present invention, there is provided a connecting tab connected between an electrode terminal of a cap plate and an electrode terminal of a PCM in a secondary battery. The connecting tab includes a PCM mounting portion, a bent portion and a terminal connecting portion.

The PCM mounting portion is electrically connected to the electrode terminal of the PCM.

The bent portion is extended from the PCM mounting portion and making a predetermined angle with the PCM mounting portion, and has at least one cut-away portion formed therein.

The terminal connecting portion is formed bent portion on the same plane with the bent portion, and extended in a lateral direction from an upper portion of the bent portion.

The cut-away portion may be formed in a round shape.

Two or more cut-away portions may be formed. An external angle formed by the bent portion and the PCM mounting portion is approximately 45 degrees.

The connecting tab may further include a support rib. The support rib may be formed on the same plane with the terminal connecting portion, and extended toward a virtual plane having the PCM mounting portion.

The width of the terminal connecting portion having the support rib may be identical to the total extended width of the bent portion.

An insulative coating layer may be formed on surfaces of the support rib.

The connecting tab may further include a bridge portion. The bridge portion is formed between the upper portion of the bent portion and the terminal connecting portion and having a width narrower than the terminal connecting portion.

According to an aspect of the present invention, there is provided a secondary battery including a can, a cap plate, a PCM, a connecting tab and a top case.

The can has a battery portion accommodated therein, and the battery portion is formed by winding a first electrode plate, a separator and a second electrode plate. The cap plate covers an opening of the can. The cap plate is provided with a first terminal portion electrically connected to the first electrode plate. The cap plate is electrically connected to the second electrode plate. The PCM is coupled to the cap plate, and provided with a pair of second terminals electrically connected to the cap plate and the first terminal portion, respectively. The connecting tab electrically connects the first terminal portion to any one of the pair of second terminals. The top case covers the PCM, and is provided with external terminals electrically connected to the pair of second terminals, respectively. The connecting tab includes a PCM mounting portion electrically connected to the PCM, a bent portion extended from the PCM mounting portion and making a predetermined angle with the PCM mounting portion, the bent portion having at least one cut-away portion formed therein, and a terminal connecting portion formed bent portion on the same plane with the bent portion, and extended in a lateral direction from an upper portion of the bent portion.

A positive temperature coefficient (PTC) thermistor may be provided between the PCM mounting portion and the second terminal of the PCM that is electrically connected to the first terminal portion.

According to an aspect of the present invention, there is provided an assembling method of a secondary battery, the method including accommodating a battery portion in an interior of a can and covering an opening of the can using a cap plate, fixing any one of a pair of second terminals in a PCM to a PCM mounting portion of a connecting tab; coupling the PCM to a top case, and bending a bent portion of the connecting tab in the state that a terminal connecting portion of the connecting tab is connected to a first terminal portion of the cap plate.

In the coupling of the PCM to the top case, the bent portion may be bent in the state that a support rib supports the terminal connecting portion while coming in contact with the cap plate.

In the coupling of the PCM to the top case, two or more cut-away portions may be bent at an angle of 45 degrees or so.

As described above, according to embodiments of the present invention, an electrical connection between a secondary battery cell and a PCM can be performed only through a simple process by using a connecting tab provided with a bent portion.

Also, the connecting tab is provided with a support rib and the bent portion, thereby enabling the electrical connection between the secondary battery cell and the PCM.

BRIEF DESCRIPTION OF THE DRAWINGS

A more complete appreciation of the invention, and many of the attendant advantages thereof, will be readily apparent as the same becomes better understood by the reference to the following detailed description when considered in conjunction with the accompanying drawings in which like reference symbols indicate the same or similar components, wherein.

DETAILED DESCRIPTION OF THE INVENTION

Figure 1:
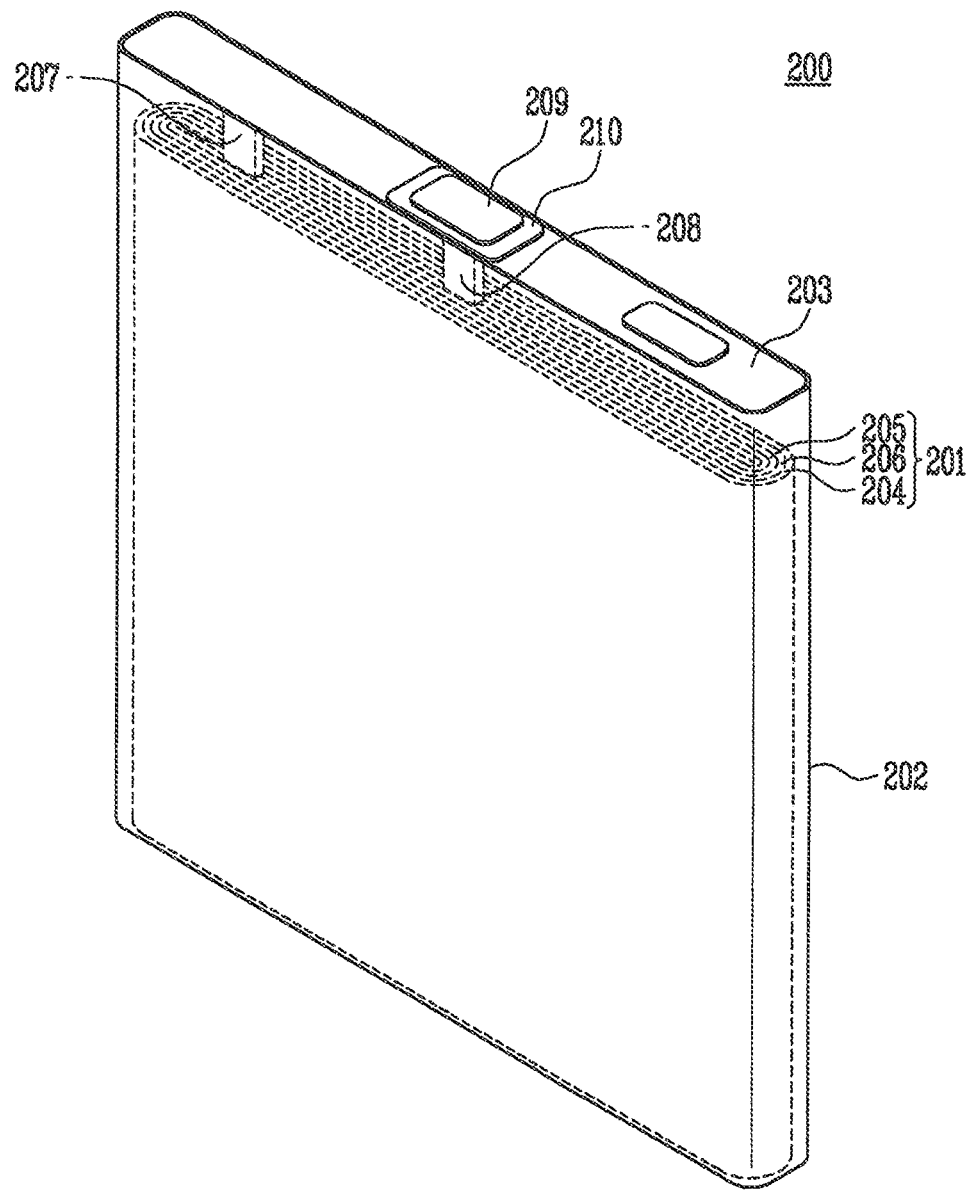
FIG. 1 is an oblique view of a secondary battery cell constructed as an embodiment according to the principles of the present invention.

In a typical prismatic secondary battery, a plurality of connection leads are separately used so that a protection circuit module (PCM) is electrically connected to a battery cell in which a battery portion is accommodated. Here, the battery portion has a positive electrode plate, a negative electrode plate and a separator. A positive output terminal (P+), a negative output terminal (P−) and a resistor output terminal (CF) are formed in the protection circuit module for the purpose of electrical connection to an external device. Here, the positive output terminal of the protection circuit module is electrically connected to the positive electrode plate of the battery portion, and the negative output terminal of the protection circuit module is electrically connected to the negative electrode plate of the battery portion. The resistor output terminal is used to read the resistance of a battery, or the like.

After the protection circuit module is coupled to the battery cell in the prismatic secondary battery, a top case made of a polymer resin is mounted to an upper portion of the battery cell, and a bottom case made of the polymer resin is mounted to a lower portion of the battery cell. Then, the top and bottom cases are inserted into a separate external case formed in a film shape, and a submersion label is attached to a top of the top case.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements. When terms that indicate directions, such as to top, bottom left and right, are used without special notation, the terms indicate directions represented in the drawings. In the drawings, the thickness or size of layers are exaggerated for clarity and not necessarily drawn to scale.

A secondary battery cell 200 constructed as an embodiment according to the principles of present invention will be described with reference to FIG. 1. FIG. 1 is an oblique transparent view of the secondary battery cell constructed as the embodiment according to the principles of present invention.

Secondary battery cell 200 includes a battery portion 201, a can 202 and a cap plate 203.

Battery portion 201 includes a positive electrode plate 204, a separator 206 and a negative electrode plate 205. Positive electrode plate 204 is composed of a positive electrode collector made of a strip-shaped metal foil and a positive electrode active material layer coated on at least one surface of the positive electrode collector. The positive electrode active material layer contains a metal oxide as a main component, and includes a positive electrode binder, a positive electrode conducting agent, and the like. Negative electrode plate 205 is composed of a negative electrode collector made of a strip-shaped metal foil and a negative electrode active material layer coated on at least one surface of the negative electrode collector. The negative electrode active material layer contains a metal oxide as a main component, and includes a negative electrode binder, a bonding agent, and the like. Separator 206 is a porous insulating material, and may include polyethylene, polypropylene or composite film thereof. Separator 206 is interposed between positive and negative electrode plates 204 and 205. Positive electrode plate 204, separator 206 and negative electrode plate 205 are wound in a state that they maybe stacked into a single- or multi-layered structure.

The wound battery portion 201 is accommodated in an interior of can 202. Can 202 is formed of a conductive metal material such as aluminum (Al), iron (Fe), or Al or Fe alloy. Can 202 may be manufactured through press molding such as deep drawing.

Meanwhile, a positive electrode lead 207 and a negative electrode lead 208 are provided so that battery portion 201 is electrically connected to an exterior thereof. Positive electrode lead 207 is connected to the positive electrode collector of positive electrode plate 204, and negative electrode lead 208 is connected to the negative electrode collector of negative electrode plate 205.

Positive electrode lead 207 is extracted in the upper direction of can 202. Positive electrode lead 207 is electrically connected to cap plate 203, but may be connected to can 202. Negative electrode lead 208 is extracted in the upper direction of can 202 and electrically connected to a negative electrode terminal 209. Negative electrode terminal 209 is insulated from cap plate 203 with a gasket 210 interposed therebetween.

An opening at the top of can 202 is covered by cap plate 203. That is, cap plate 203 is attached closely to and adheres to the top of can 202 through welding.

In the secondary battery cell 200, can 202 itself serves as a positive electrode output terminal, and only a negative electrode output terminal is formed in a protection circuit module (PCM). That is, the positive electrode output terminal is formed in a path from positive electrode lead 207 extracted from positive electrode plate 204 to cap plate 203 to which positive electrode lead 207 is welded or to can 202 to which cap plate 203 is welded. The negative electrode output terminal is formed in a path from negative electrode lead 208 extracted from negative electrode plate 205 to negative electrode terminal 209 connected to negative electrode lead 208. Although not shown in the drawings, the PCM is constructed with two electrode terminals respectively and electrically connected to cap plate 203 and negative electrode terminal 209.

Figure 2A:
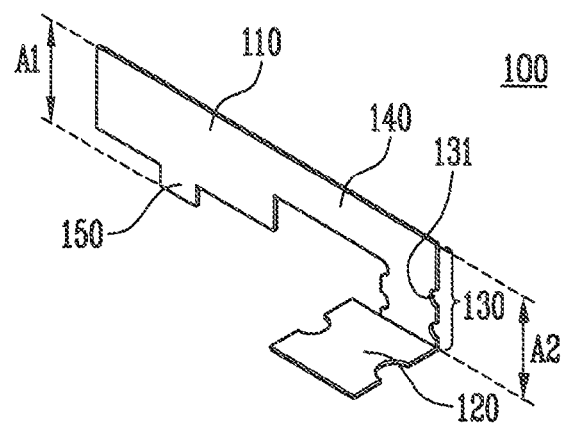
FIG. 2A is an oblique view showing a connecting tab constructed as an embodiment according to the principles of the present invention.
Figure 2B:
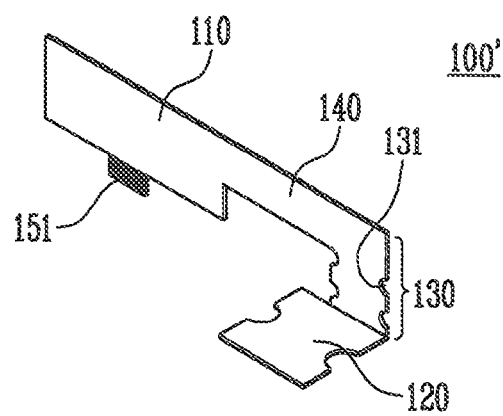
FIG. 2B is an oblique view showing a connecting tab constructed as another embodiment according to the principles of the present invention.
Figure 2C:
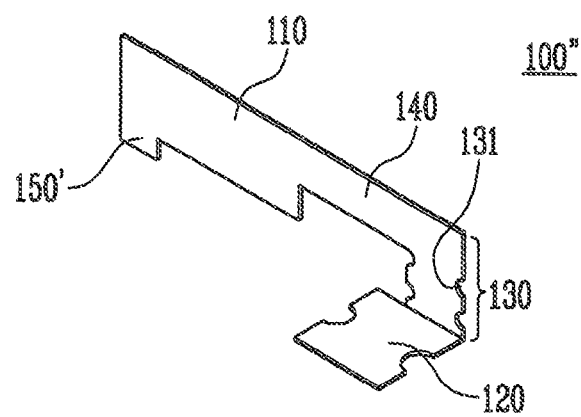
FIG. 2C is an oblique view showing a connecting tab constructed as still another embodiment according to the principles of the present invention.

Connecting tabs 100 will be described with reference to FIGS. 2A to 2C. FIG. 2A is an oblique view showing a connecting tab constructed as an embodiment according to the principles of the present invention. FIG. 2B is an oblique view showing a connecting tab constructed as another embodiment according to the principles of the present invention. FIG. 2C is an oblique view showing a connecting tab constructed as still another embodiment according to the principles of the present invention.

As shown in FIG. 2A, connecting tab 100 constructed as the embodiment according to the principles of the present invention has a PCM mounting portion 120, a bent portion 130, a bridge portion 140, a terminal connecting portion 110 and a support rib 150. PCM mounting portion 120 is connected to the PCM.

PCM mounting portion 120 is a portion formed in a strip shape and electrically connected to an electrode terminal of the PCM which will be described later. Bent portion 130 is formed to be extended in a vertical direction from one side of PCM mounting portion 120. At least one cut-away portion 131 is formed at a lower portion of bent portion 130. The lower portion of bent portion 130, at which cut-away portion 131 is formed, has a lower strength than the other portions of bent portion 130. Therefore, in a case where a force in a vertical direction is applied to bent portion 130 to be bent, the portion of bent portion 130, at which cut-away portion 31 is formed, is first bent. Meanwhile, cut-away portion 131 may be formed in a round shape so that fracture does not occur during the bending of bent portion 130. Two or more cut-away portions 131 may be formed at bent portion 130. In a case where a certain force is applied to bent portion 130, the force is distributed to the plurality of cut-away portions 131, so that it is possible to prevent the occurrence of fracture.

Bridge portion 140 is formed to be extended in a lateral direction from an upper portion of bent portion 130. Bridge portion 140 is formed to have a narrower width than terminal connecting portion 110 which will be described later. Since the width of bridge portion 140 is narrower than that of terminal connecting portion 110, the resistance of bridge portion 140 is formed relatively higher than that of terminal connecting portion 110. Thus, in a case where overcurrent flows in connecting tab 100, heat is first generated in bridge portion 140 as compared with the other portions including terminal connecting portion 110, and the like. In a case where current exceeds a predetermined value, bridge portion 140 is disconnected to serve as a fuse. When the bending force is applied to bent portion 130, bent portion 130 is bent such that the terminal connecting portion 110 is substantially in parallel with PCM mounting portion 120.

The width of terminal connecting portion 110 is formed wider than that of bridge portion 140, and terminal connecting portion 110 is formed with the upper portion of bent portion 130 and bridge portion 140 on one plane. Terminal connecting portion 110 is electrically connected to negative electrode terminal 209 (see FIG. 1) provided to cap plate 203 of secondary battery cell 200, which is described above.

Support rib 150 is formed to be extended downward from terminal connecting portion 110, i.e., toward a virtual plane including PCM mounting portion 120. In a case where the secondary battery including connecting tab 100 according to this embodiment is assembled, support rib 150 supports terminal connecting portion 110 so that terminal connecting portion 110 is not bent or inclined. Therefore, support rib 150 may be formed with terminal connecting portion 110 on the same plane. In order to directly support terminal connecting portion 110, width A1 of terminal connecting portion 110 including support rib 150 may be formed identical to the total extended width A2 of the bent portion 130.

Meanwhile, as shown in FIG. 2B, in connecting tab 100' constructed as another embodiment according to the principles of the present invention, an insulative coating layer 151 may be formed on surfaces of support rib 150. When the secondary battery including connecting tab 100 according to this embodiment is assembled, support rib 150 may be short-circuited with cap plate 203 or another circuit such as an electric device or internal circuit included in the PCM. Insulative coating layer 151 included in connecting tab 100' functions to reduce the risk of an electric short circuit.

Meanwhile, the position of support rib 150 is not particularly limited. That is, as long as the support rib is formed at a bottom of terminal connecting portion 110 to support terminal connecting portion 110, support rib 150 may be formed at the center of the bottom of terminal connecting portion 110 as shown in FIG. 2A, or support rib 150' may be formed at one end portion of terminal connecting portion 110'' as shown in FIG. 2C. The position of the support rib may be determined in consideration of the position of negative electrode terminal 209 (see FIG. 1) and the insulation relation between the support rib and negative electrode terminal 209.

Figure 3:
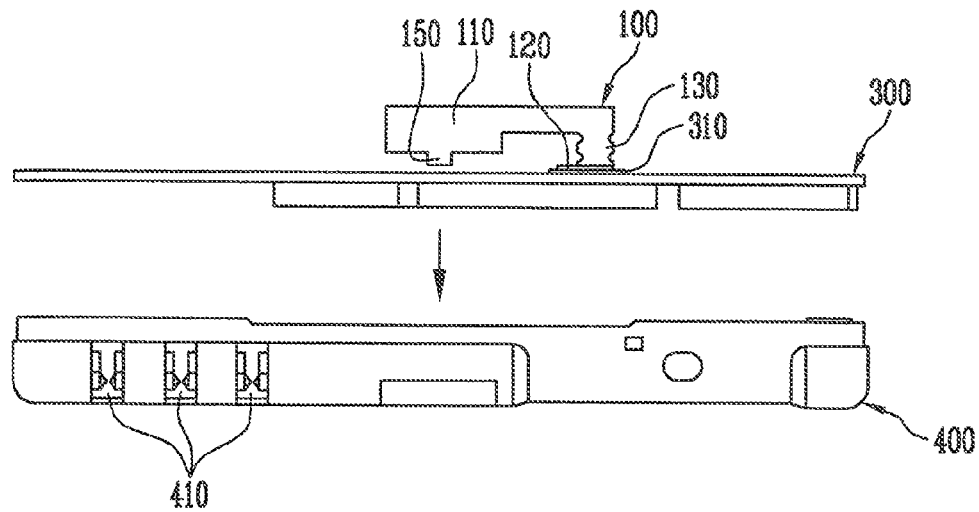
FIG. 3 is an exploded top view showing an upside-down state of an upper assembly of a secondary battery constructed as an embodiment according to the principles of the present invention.

A PCM 300 and a top case 400 will be described with reference to FIG. 3. FIG. 3 is an exploded oblique view showing an upside-down state of an upper assembly of a secondary battery according to the present invention. Here, the term "upper assembly" refers to a part including PCM 300 and top case 400, provided to the top of secondary battery cell 200.

PCM 300 is formed by mounting a plurality of electronic devices on a base circuit board. PCM 300 includes a positive temperature coefficient (PTC) device, an IC, an FET, a resistor, a capacitor and the like so as to ensure safety in an operation of the secondary battery. Meanwhile, the PTC device is a positive temperature coefficient (PTC) thermistor that has a characteristic in which resistance is in proportion to temperature. The PTC thermistor functions to protect the secondary battery cell from a risk such as overcurrent. The PTC thermistor may be provided between PCM mounting portion 120 and a second terminal 310.

Meanwhile, top case 400 is coupled to one side of PCM 300. A plurality of external terminals 410 are spaced apart in positions oriented to connect between an external circuit and electrical paths respectively connected from positive and negative electrode plates 204 and 205 are formed in top case 400. External terminals 410 may include a resistor output terminal to read resistance, a ground terminal, and the like. Since components related to the electrical connection of top case 400 are irrelevant to the core of the present invention, their detailed descriptions will be omitted.

Figure 4A:
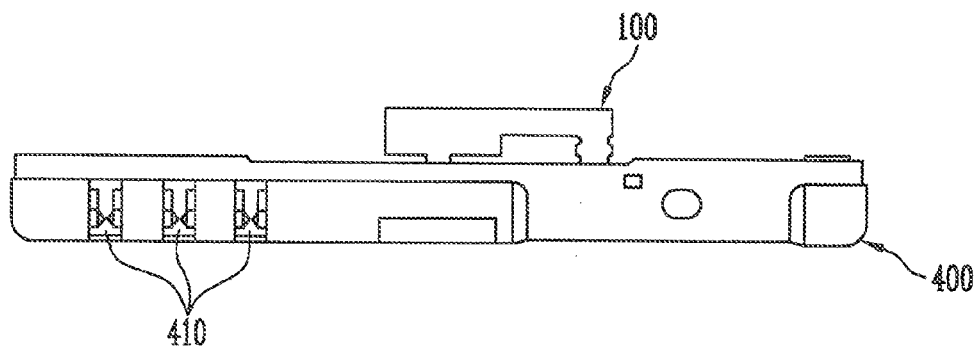
FIG. 4A is a top view showing the upside-down state of the upper assembly of the secondary battery constructed as the embodiment according to the principles of the present invention.
Figure 4B:
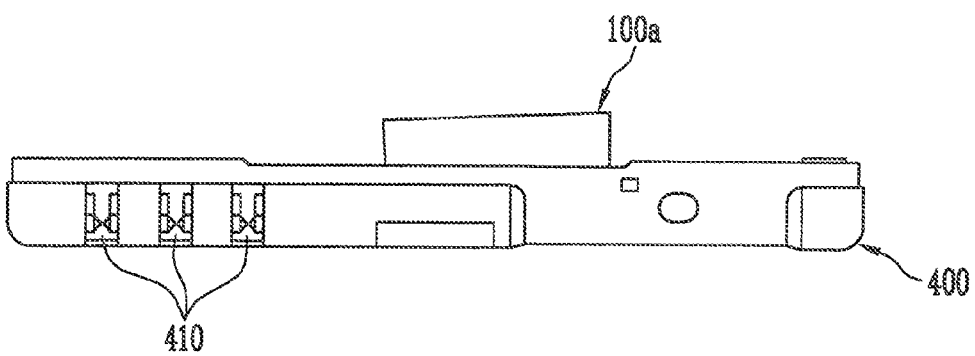
FIG. 4B is a top view showing the upside-down state of an upper assembly of a secondary battery according to a comparative example.
Figure 5:
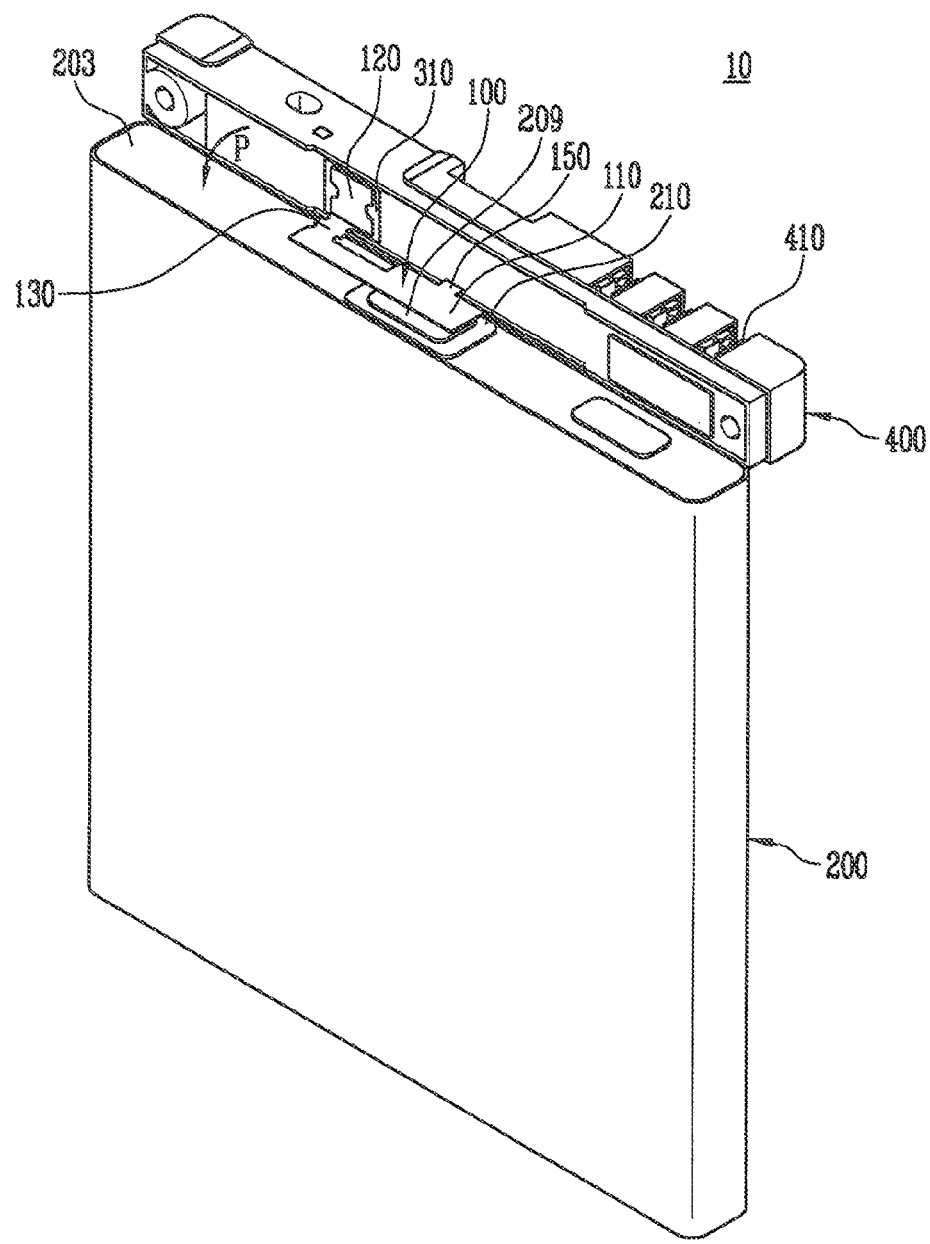
FIG. 5 is an oblique view illustrating the upper assembly of the secondary battery and an assembling process of the secondary battery cell according to the present invention.
Figure 6:
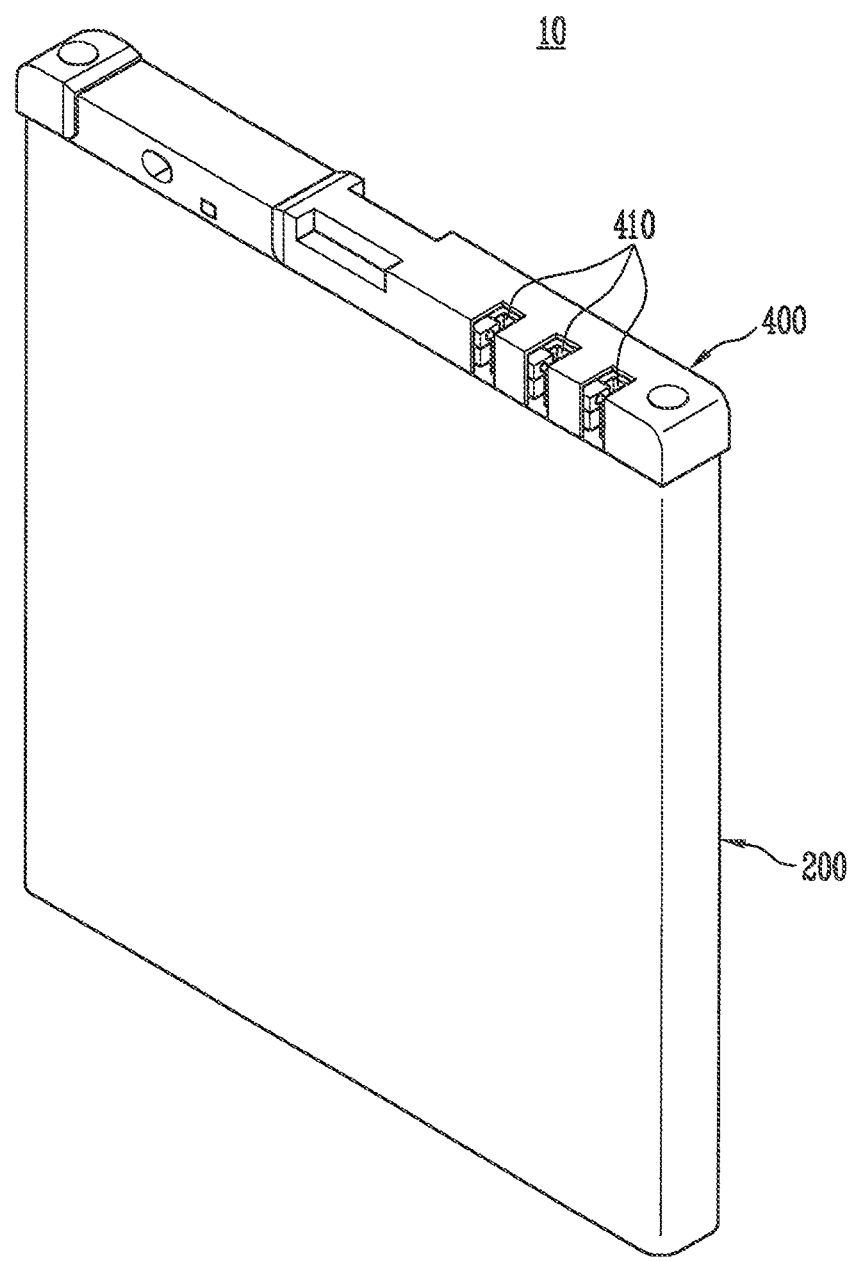
FIG. 6 is an oblique view showing an assembled state of the secondary battery according to the present invention.
Figure 8:
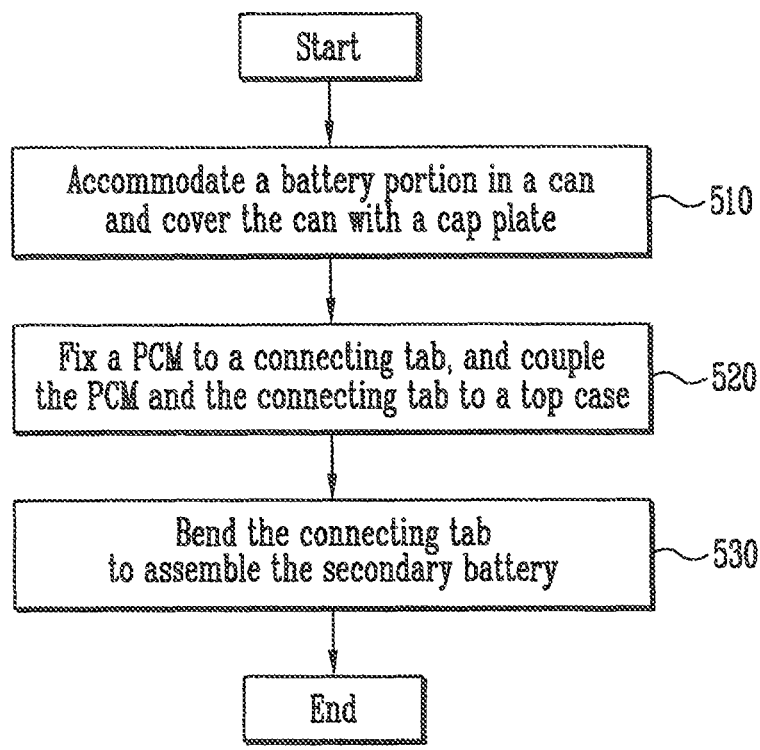
FIG. 8 is a flow chart illustrating a process for assembling a secondary battery as an embodiment according to the principles of the present invention.

A method for assembling the secondary battery to be fabricated according to the principles of the present invention will be described with reference to FIGS. 1, 3 to 6, and 8. FIG. 4A is a top view showing the upside-down state of the upper assembly of the secondary battery according to the present invention. FIG. 4B is a top view showing the upside-down state of an upper assembly of a secondary battery according to a comparative example. FIG. 5 is an oblique view illustrating the upper assembly of the secondary battery and an assembling process of the secondary battery cell according to the present invention. FIG. 6 is an oblique showing an assembled state of the secondary battery according to the present invention. FIG. 8 is a flow chart illustrating a process for assembling a secondary battery as an embodiment according to the principles of the present invention.

First, secondary battery cell 200 is manufactured as shown in FIG. 1. That is, battery portion 201 is accommodated in the interior of can 202, and the opening of can 202 is covered by cap plate 203 (step 510 in FIG. 8). Subsequently, as shown in FIG. 4A, connecting tab 100 is fixed and/or coupled to PCM 300, and PCM 300 is fixed and/or coupled to top case 400 (step 520). In a case where there is no support rib 150 of connecting tab 100, a connecting tab 100a may be inclined to one side during the manufacturing process as shown in FIG. 4B. Because of the tolerance of the connecting tab itself, the connection may not be precisely performed, or a short circuit between the connecting tab and the negative electrode terminal may occur.

Subsequently, as shown in FIG. 5, terminal connecting portion 110 of connecting tab 100 and negative electrode terminal 209 are fixed in the state that they are electrically connected to each other. In this state, an upper assembly including PCM 300 and top case 400 is pushed in bending direction P of connecting tab 100, so that secondary battery 10 is assembled as shown in FIG. 6 (step 530). In this instance, support rib 150 supports terminal connecting portion 110 so that terminal connecting portion 110 can come in contact with negative electrode terminal 209 at an exact position. Positive electrode terminal 420 is positioned on the underside of top case 400 in alignment with a corresponding one of the plurality of the external terminals 410, coupled to positive electrode plates 204. As shown in FIG. 6, secondary battery 10 is assembled so that connecting tab 100 is not exposed to the exterior thereof.

Figure 7A:
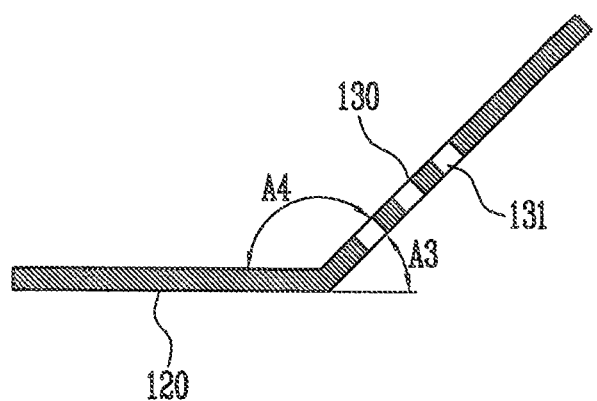
FIG. 7A is a side view showing a connecting tab constructed as still another embodiment according to the principles of the present invention.
Figure 7B:
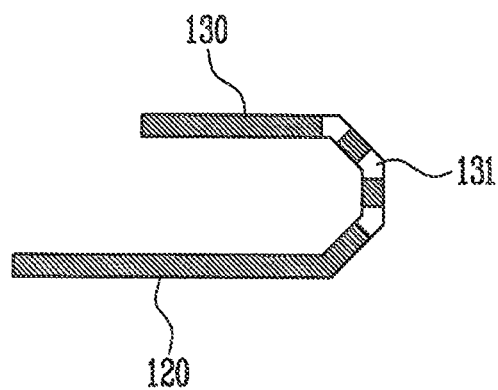
FIG. 7B is a side view showing a bent state of the connecting tab of FIG. 7A.

A connecting tab according to still another embodiment of the present invention will be described with reference to FIGS. 7A and 7B. FIG. 7A is a side view showing a connecting tab constructed as still another embodiment according to the principles of the present invention. FIG. 7B is a side view showing a bent state of the connecting tab of FIG. 7A.

The connecting tab according to this embodiment has a difference from the connecting tab of the aforementioned embodiments at an initial angle of bent portion 130. The configuration except the initial angle of bent portion 130 is identical to those of the aforementioned embodiments described above.

Bent portion 130 is extended so that the external angle A3 formed by bent portion 130 and PCM mounting portion 120 is smaller than 90 degrees. That is, the internal angle A4 formed by bent portion 130 and PCM mounting portion 120 is larger than 90 degrees.

When assuming that three cut-away portions 131 are formed in bent portion 130, the external angle A3 formed by bent portion 130 and PCM mounting portion 120 may be about 45 degrees, and the internal angle A4 formed by bent portion 130 and PCM mounting portion 120 may be about 135 degrees. In a case where bent portion 130 is bent by an external force, the three cut-away portions 131 are bent. Then, the external angle formed by both sides of each of cut-away portions 131 is about 45 degrees as shown in FIG. 7B. That is, the internal angle formed by both sides of each of cut-away portions 131 is about 135 degrees.

In a case where the bending angle of a current path is 45 degrees or more in a conducting wire or pattern of a circuit, loss may occur due to the reflection of some power. That is, when the external angle formed by the bent portion 130 and PCM mounting portion 120 is more than 45 degrees, loss may occur. In a case where bent portion 130 is bent while making an angle of 45 degrees or so as shown in FIG. 7B, it is possible to minimize the current and/or power loss.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A connecting tab of a secondary battery, the connecting tab being mounted and electrically connected between an electrode terminal of a cap plate and an electrode terminal of a protection circuit module (PCM) in the secondary battery, the connecting tab comprising:
    a PCM mounting portion electrically connected to the electrode terminal of the PCM; a bent portion extended from the PCM mounting portion and making a predetermined angle with the PCM mounting portion, the bent portion having at least one cut-away portion formed therein;
    a terminal connecting portion formed to share two opposite common surfaces with the bent portion and extended in a lateral direction from an upper portion of the bent portion; and
    a support rib formed on the same plane with the terminal connecting portion and extended toward a virtual plane having the PCM mounting portion.

2. The connecting tab according to claim 1, wherein the cut-away portion is formed in a round shape.

3. The connecting tab according to claim 1, wherein an external angle formed by the bent portion and the PCM mounting portion is approximately 45 degrees.

4. The connecting tab according to claim 1, wherein the width of the terminal connecting portion having the support rib is identical to the total extended width of the bent portion.

5. The connecting tab according to claim 1, wherein an insulative coating layer is formed on surfaces of the support rib.

6. The connecting tab according to claim 1, wherein a bridge portion is formed between the upper portion of the bent portion and the terminal connecting portion and has a width narrower than the terminal connecting portion.

7. A secondary battery, comprising:
    a can having a battery portion accommodated therein, wherein the battery portion is formed by winding of a first electrode plate, a separator and a second electrode plate;
    a cap plate covering an opening of the can and provided with a first terminal portion electrically connected to the first electrode plate, the cap plate being electrically connected to the second electrode plate;
    a protection circuit module (PCM) coupled to the cap plate and provided with a pair of second terminals electrically connected to the cap plate and the first terminal portion, respectively;
    a connecting tab electrically connecting the first terminal portion to one of the pair of second terminals of the PCM; and a top case covering the PCM and provided with external terminals electrically connected to the pair of second terminals, respectively, the connecting tab comprising:
- a PCM mounting portion electrically connected to the PCM;
- a bent portion extended from the PCM mounting portion and making a predetermined angle with the PCM mounting portion, the bent portion having at least one cut-away portion formed therein;
- a terminal connecting portion formed to share two opposite common surfaces with the bent portion and extended in a lateral direction from an upper portion of the bent portion; and
- a support rib formed on the same plane with the terminal connecting portion and extended toward a virtual plane having the PCM mounting portion.

8. The secondary battery according to claim 7, wherein a positive temperature coefficient (PTC) thermistor is provided between the PCM mounting portion and the second terminal of the PCM that is electrically connected to the first terminal portion.

9. The secondary battery according to claim 7, wherein the cut-away portion is formed in a round shape.

10. The secondary battery according to claim 7, wherein an external angle formed by the bent portion and the PCM mounting portion is approximately 45 degrees.

11. The secondary battery according to claim 7, wherein the width of the terminal connecting portion having the support rib is identical to the total extended width of the bent portion.

12. The secondary battery according to claim 7, wherein an insulative coating layer is formed on surfaces of the support rib.

13. The secondary battery according to claim 7, wherein a bridge portion is formed between the upper portion of the bent portion and the terminal connecting portion and has a width narrower than the terminal connecting portion.

14. An assembling method of a secondary battery, the method comprising:
- accommodating a battery portion in an interior of a can and covering an opening of the can using a cap plate;
- fixing one of a pair of second terminals in a protection circuit module (PCM) to a PCM mounting portion of a connecting tab, the connecting tab comprising a bent portion extended from the PCM mounting portion and making a predetermined angle with the PCM mounting portion, the connecting tab further comprising a terminal connecting portion formed to share two opposite common surfaces with the bent portion, and the connecting tab further comprising a support rib formed on the same plane with the terminal connecting portion and extended toward a virtual plane having the PCM mounting portion;
- coupling the PCM and the connecting tab to a top case; and
- bending the bent portion of the connecting tab into a state such that the terminal connecting portion of the connecting tab is connected to a first terminal portion of the cap plate.

15. The assembling method of claim 14, wherein during the coupling of the PCM to the top case, the bent portion is bent such that the support rib supports the terminal connecting portion while coming in contact with the cap plate.

16. The assembling method of claim 14, the bent portion comprising two or more cut-away portions, and, during the coupling of the PCM to the top case, the bent portion being bent such that an internal angle of 135 degrees is formed at each one of the two or more cut-away portions.

\* \* \* \* \*